United States Patent
Yamamoto et al.

(10) Patent No.: US 6,654,667 B2
(45) Date of Patent: Nov. 25, 2003

(54) PRODUCTION APPARATUS THAT DETECTS IRREGULARITIES IN A MOUNTING LINE AND CONTROLS POWER CONSUMPTION, AND A CONTROL METHOD AND CONTROL PROGRAM FOR THE PRODUCTION APPARATUS

(75) Inventors: Akiko Yamamoto, Osaka (JP); Kenji Okamoto, Hirakata (JP)

(73) Assignee: Matsushita Electric Industrial Co., Ltd., Osaka-Fu (JP)

(*) Notice: Subject to any disclaimer, the term of this patent is extended or adjusted under 35 U.S.C. 154(b) by 175 days.

(21) Appl. No.: 09/915,288

(22) Filed: Jul. 27, 2001

(65) Prior Publication Data

US 2003/0023349 A1 Jan. 30, 2003

(51) Int. Cl.[7] .................................................. H02J 1/00
(52) U.S. Cl. .......................... 700/295; 307/62; 324/73.1; 700/291; 714/724
(58) Field of Search ................... 700/295, 29; 714/724; 307/62; 324/754, 73.1; 29/593; 701/115

(56) References Cited

U.S. PATENT DOCUMENTS

| | | | | |
|---|---|---|---|---|
| 4,106,097 A | * | 8/1978 | Fox et al. | 307/62 |
| 4,329,685 A | * | 5/1982 | Mahon et al. | 257/529 |
| 6,128,757 A | * | 10/2000 | Yousuf et al. | 714/724 |
| 6,480,401 B2 | * | 11/2002 | Tang | 363/21.02 |

* cited by examiner

Primary Examiner—Albert W. Paladini
(74) Attorney, Agent, or Firm—Wenderoth, Lind & Ponack, L.L.P.

(57) ABSTRACT

In an active mode, a controller switches an operation mode from the active mode to a suspend mode when an acceptance preparation completion signal is not received from downstream or when a circuit board is discharged downstream, if a discharge preparation completion signal has not been received from upstream. The controller controls relay apparatuses and adjusts a flow of current to control units, in addition to controlling its own CPU clock frequency.

21 Claims, 8 Drawing Sheets

FIG.3

| OPERATION MODE | RELAY 1 | RELAY 2 | RELAY 3 | CLOCK |
|---|---|---|---|---|
| 1 | ON | ON | ON | H |
| 2 | OFF | ON | ON | M |
| 3 | OFF | OFF | ON | L |
| 4 | OFF | OFF | OFF | M |
| 5 | OFF | OFF | OFF | OFF |

PRODUCTION APPARATUS THAT DETECTS IRREGULARITIES IN A MOUNTING LINE AND CONTROLS POWER CONSUMPTION, AND A CONTROL METHOD AND CONTROL PROGRAM FOR THE PRODUCTION APPARATUS

BACKGROUND OF THE INVENTION

(1) Field of the invention

The present invention relates to a production apparatus that performs one procedure in a mounting line for mounting electronic components on a circuit board, and a control method and a control program for the production apparatus.

(2) Description of the Related Art

Conventionally, electronic component mounting systems are used to perform the work of mounting electronic components. FIG. 1 shows an outline of an electronic component mounting line. Components are mounted on a circuit board which is sent from a solder printer 21 upstream and is successively processed as it is sent downstream. The solder printer 21 prints solder on a circuit board 24, and discharges the circuit board 24 to a conveyer belt 23. After an electronic component mounting device 11 accepts the circuit board 24 from the conveyor belt 23, it mounts electronic components on the circuit board 24 and discharges the circuit board to the conveyor belt 23. A detection device 31, after accepting the circuit board 24 from the conveyor belt 23, detects the circuit board 24.

However, sometimes irregularities occur in a production apparatus which is part of the component mounting process line. These irregularities include components or solder running out, unit breakdowns and errors by the conveyor belt carrying the circuit board. As a result, the circuit board may fail to be accepted from upstream or discharged downstream. In such cases, an operator discovers the irregularity and restores the system or turns the power off.

However, the units in the production apparatus continue to operate even if the mounting process ceases, meaning that power is consumed wastefully.

SUMMARY OF THE INVENTION

In view of the above-described problems, the objective of the present invention is to provide a production apparatus which prevents wasteful consumption of power automatically and promptly when processing is not being performed because a circuit board does not flow normally in a component mounting line.

As is clear from the above explanation, the present invention is a production apparatus that performs one procedure in a mounting line for mounting electronic components to a circuit board, including a judgment unit for judging, after preparation by the production apparatus for possible accepting of a circuit board from an upstream production apparatus is complete, whether there is a circuit board to be accepted from the upstream production apparatus; and a control unit for controlling so that energy consumption by the production apparatus is reduced, when the judgment unit judges that there is no circuit board to be accepted.

According to the stated construction, when an irregularity occurs in an upstream production apparatus and there is no circuit board to be accepted by the production apparatus, the production apparatus reduces its power consumption. As a result, power is not consumed wastefully when the mounting process is not being performed.

Here, the production apparatus may further include a reception unit for receiving a first signal from the upstream production apparatus that notifies that preparation for possible discharging of a circuit board from the upstream production apparatus is complete, the judgment unit judging, if the first signal is not received after the preparation for possible discharging of a circuit board from the upstream production apparatus is complete, that there is no circuit board to be accepted.

According to the stated construction, it can be judged highly reliably and promptly when a signal notifying completion of preparation to discharge a circuit board is not accepted from the upstream apparatus, that there is a high probability that there is some kind of irregularity in the upstream production apparatus and that there is no circuit board to be accepted.

Here, the judgment unit may judge, when a circuit board has not been accepted by the production apparatus within a predetermined time after the preparation for possible accepting of a circuit from the upstream production apparatus is complete, that there is no circuit board to be accepted.

According to the stated construction, it can be judged highly reliably and promptly when a circuit board is not actually accepted within a predetermined time after preparation for accepting is complete, that there is a high probability that there is some kind of irregularity in the upstream production apparatus and that there is no circuit board to be accepted.

Here, the production apparatus further includes a plurality of controllers, and the control unit stops power supply to the controllers successively in ascending order of time required for warming tip, after the preparation for possible accepting of a circuit board is complete.

According to the stated construction, power supply is stopped successively starting with the control component which requires the shortest time for warming up, therefore when the line recovers to its normal state, the mounting process can be resumed promptly.

Here, the control unit has a central processing unit, and reduces a clock frequency supplied to the central processing un it in response to a result of judgment by the judgment unit.

According to the stated construction, rather than stopping power supply to the control components, the clock frequency of the CPU of the controller itself is set to a slow speed, meaning that consumed power can be further reduced.

Furthermore, the present invention is a production apparatus that performs one process in a mounting line for mounting electronic components to a circuit board, including a judgment unit for judging, after preparation by the production apparatus for possible discharging of a circuit board to a downstream production apparatus is complete, whether there is an irregularity in a line which is to carry the circuit board to the downstream production apparatus, and a control unit for controlling so that energy consumption by the production apparatus is reduced, when the judgment unit judges that there is an irregularity in a line which is to carry the circuit board to the downstream production apparatus.

According to this, when irregularities in the conveying system such as in the conveyor belt occur, and the production apparatus cannot discharge the circuit board, the production apparatus reduces the amount of power it consumes, therefore wasteful use of power can be prevented when the mounting process is not taking place.

Here, the judgment unit judges that there is an irregularity in a line which is to carry the circuit board to the downstream production apparatus when the production apparatus does not discharge the circuit board within a predetermined time after the preparation by the production apparatus for possible discharging of a circuit board to a downstream production apparatus is complete.

According to the stated construction, when a circuit board is not discharged within a predetermined time after completion of preparation to discharge the circuit board, it can be judged with high reliably that there is a high possibility that an irregularity has occurred in, for instance, the conveying system, and that the production apparatus cannot discharge a circuit board.

Furthermore, the present invention is a production apparatus that performs one procedure in a mounting line for mounting electronic components to a circuit board, including a judgment unit for judging, after preparation by the production apparatus for possible discharging of a circuit board to a downstream production apparatus is complete, whether the downstream production apparatus can accept the circuit board, and a control unit for controlling so that energy consumption by the production apparatus is reduced, when the judgment unit judges that the downstream production apparatus cannot accept the circuit board.

According to the stated construction, when an irregularity occurs in a downstream production apparatus, and the downstream apparatus cannot discharge a circuit board, the production apparatus reduces the amount of power it consumes, therefore wasteful use of power can be prevented when the mounting process is not taking place.

Here, the production apparatus further includes a reception unit for receiving a first signal from the downstream production apparatus that notifies that preparation for possible accepting of the circuit board by the downstream production apparatus is complete, the judgment unlit judging, if the first signal is not received after the preparation for possible discharging of the circuit board from the upstream production apparatus is complete, that the downstream production apparatus cannot accept the circuit board.

According to the stated construction, it can be judged highly reliably and promptly, when a signal notifying completion of preparation to discharge a circuit board is not accepted from the upstream apparatus, that there is a high probability that there is some kind of irregularity in the upstream production apparatus and that there is no circuit board to be accepted.

Furthermore, the present invention is a production apparatus that performs one procedure in a mounting line for mounting electronic components to a circuit board, including a reception unit for receiving an instruction signal from a another production apparatus on the mounting line instructing a reduction of energy consumption, and a control unit for controlling, when the instruction signal is received, the reduction of energy consumption by the apparatus.

According to the stated construction, when an irregularity is sensed in another apparatus and the flow of the circuit board is stopped, the production apparatus reduces the amount of power it consumes, therefore wasteful use of power can be prevented.

Furthermore, the present invention is a production apparatus that performs one procedure in a mounting line for mounting electronic components to a circuit board, including a detection unit for detecting an irregularity in one of the procedures in the mounting line, and a transmission unit for transmitting, when the detection unit detects an irregularity, an instruction signal instructing a reduction in energy consumption to another production apparatus on the mounting line.

According to the stated construction, when the flow of a circuit board is stopped as a result of an irregularity in the production apparatus or any of the other production apparatuses in the production line, the production apparatus sends a signal to the other production apparatuses to reduce power consumed, therefore wasteful use of power by other apparatuses can be prevented. Furthermore, when a critical irregularity occurs and recovery does not seem likely, it is possible to turn all the apparatuses off.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 3 shows an example of operation modes;

DESCRIPTION OF THE PREFERRED EMBODIMENTS

The following explains the preferred embodiments of the present invention with reference to the drawings.

First Embodiment

The present embodiment relates to an electronic component mounting device in an electronic component mounting line that judges whether a circuit board is flowing normally, based on signals sent between an upstream device and a downstream device showing that preparation for accepting or discharging a circuit board is complete, and decreases its power consumption when the circuit board is judged not to be flowing normally.

<Structure>

Figure 1:
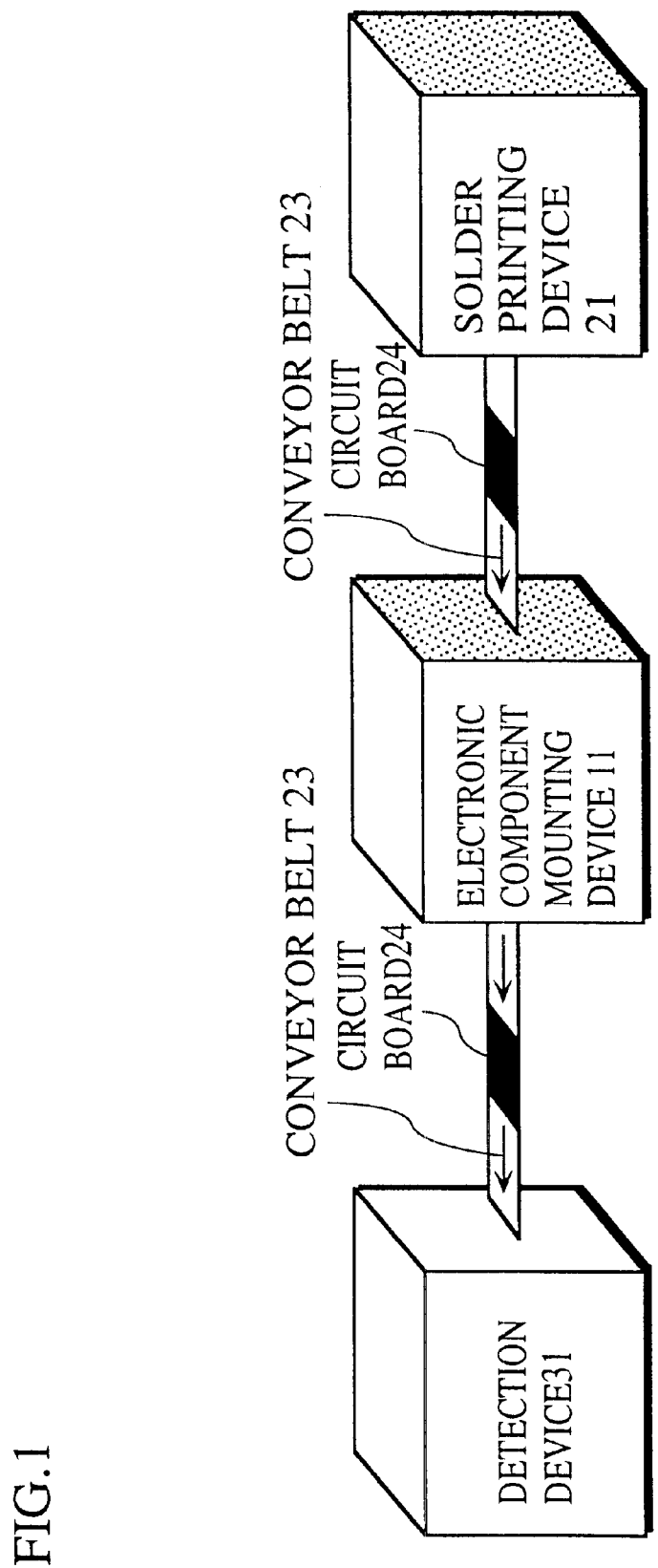
FIG. 1 shows an outline of an electronic component mounting line.
Figure 2:
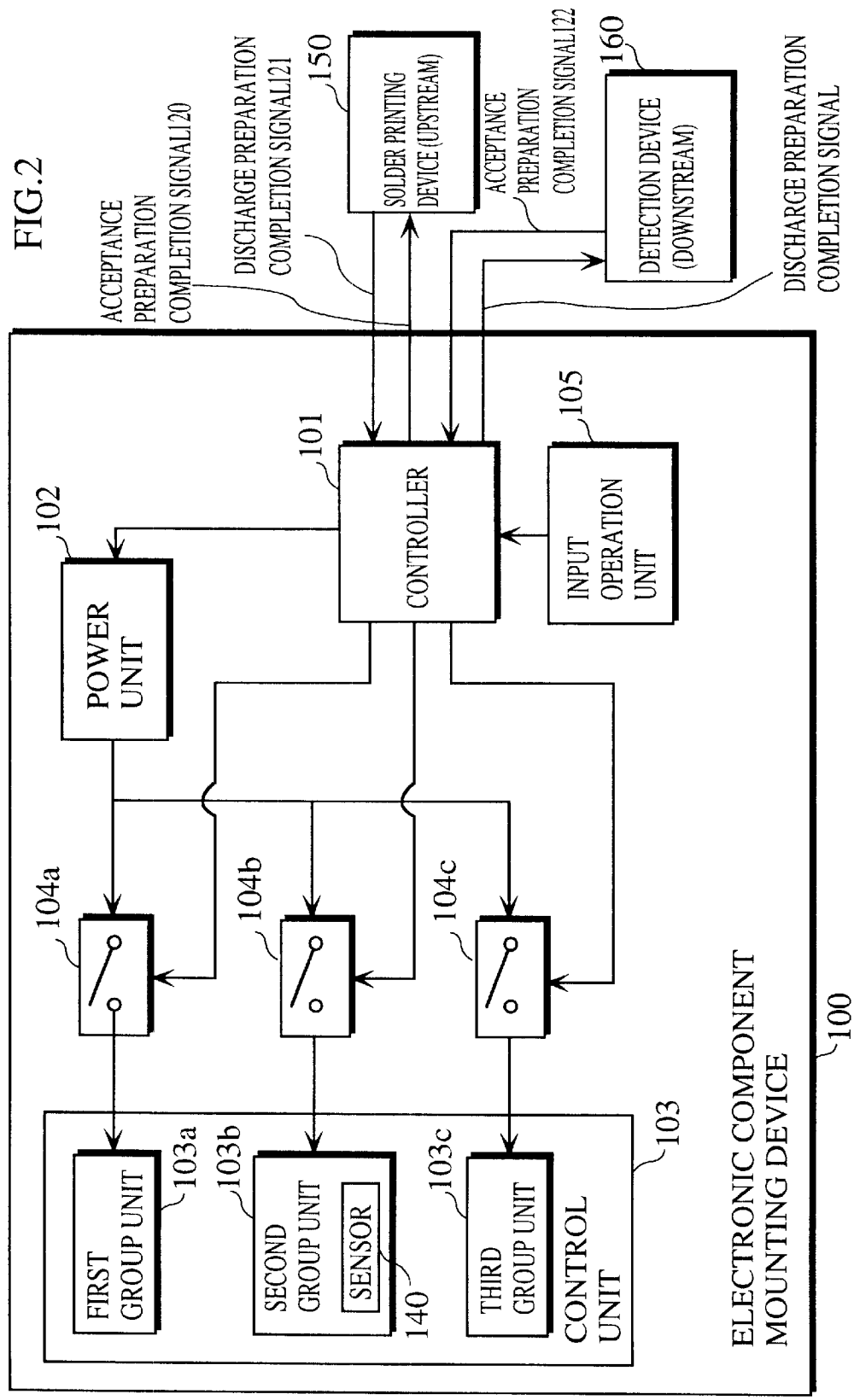
FIG. 2 is a block drawing showing the structure of the electronic component mounting device in an embodiment of the present invention.

FIG. 2 is a block drawing of the structure of the electronic component mounting device of the present embodiment. An electronic component mounting device 100 is composed of a controller 101, a power unit 102, relay apparatuses 104a to 104c, and a control unit 103.

The power unit 102 provides power to the units of the electronic component mounting device.

The control unit 103 is for executing an electronic component mounting process, and is divided into three groups. Specifically, the first group unit 103a is a driver which moves a nozzle and a head, and is in a drivable state as soon as power is switched to ON (i.e., does not require much time to warm tip). The second unit 103b is, for instance, a halogen type or LED recognition system which reflects light in order to recognize the position of components. The second group unit 103b requires much time to warm up. The third group unit 103c is a driver that accepts and discharges circuit boards from and to the conveyor belt.

A sensor 140, which is part of the control unit 103, senses accepting and discharging of the circuit board by whether the projected light is transmitted or not.

Relay apparatuses 104a to 104c regulate the flow of current to the control units 103a to 103c, respectively.

An input operation unit 105 receives operations to switch the power unit 102 to ON, and operation mode selection instructions from an operator. FIG. 3 shows an example of various operation modes. As shown in the figure, the regulating of each of the three relay apparatuses 104a to 104c and the clock frequency of the controller 101 CPU are different. The operator sets each of the operation mode when the power is ON (active mode), the operation mode when the circuit board flows normally (standby mode), and the operation mode when flow of the circuit board is stopped (suspend mode) to one of the five mode shown in FIG. 3.

When preparation to accept a circuit board is complete (i.e., when the electronic component mounting device is prepared to accept a circuit board), the controller 101 transmits an acceptance preparation completion signal to an upstream solder printing device 150, and when preparation to discharge the circuit board from the solder printing device 150 is complete, the controller 101 transmits a discharge preparation completion signal to a downstream sensor 160. In addition, the controller 101 receives a discharge preparation completion signal 121 transmitted from the upstream solder printing device 150 after preparation to discharge the circuit board is complete, and receives an acceptance preparation completion signal 122 transmitted from the downstream sensor 160 after preparation to discharge the circuit board is complete.

The controller 101 switches the operation mode of these according to the received signals, and controls the relay apparatuses 104a to 104c based on the operation mode to adjust the flow of current to the control unit 103. In addition, controller 101 also controls the clock frequency of its own CPU.

The controller 101 switches the operation mode (i.e., makes a judgment) according to the following rules A1 and A2.

A1: The controller 101 switches to suspend mode when, in active mode, an acceptance preparation completion signal notifying that preparation to accept the next circuit board is complete is not received from downstream.

A2: The controller 101 switches to suspend mode when, in active mode, a discharge preparation completion signal notifying that preparation to discharge the next circuit board is complete has not been received from the upstream device at the point where circuit board is discharged to a downstream device.

<Operations>

Figure 4:
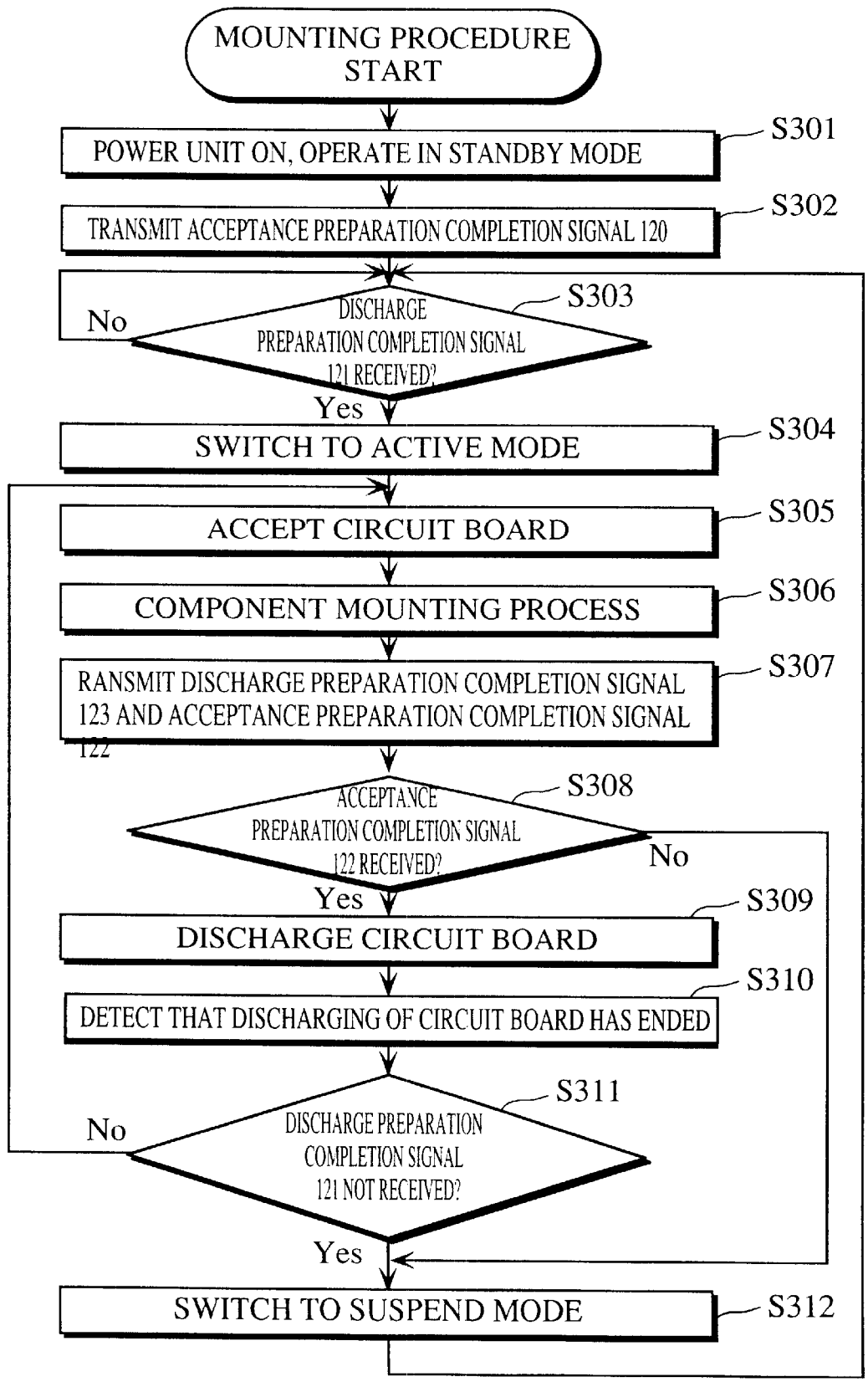
FIG. 4 is a flowchart showing the operations of the processes of the electronic component mounting device.

Next the operations of the electronic component mounting device in the present embodiment will be explained. FIG. 4 is a flowchart showing the operations of the processes of the electronic component mounting device, and FIG. 5 is a timing chart showing the execution timing of each operation.

First, it is assumed that the operator has already selected operation modes. Here, "Operation Mode 4" which consumes the least amount of power is selected for standby mode. "Operation Mode 1" which consumes much power is selected for active mode. "Operation Mode 3" which consumes relatively little power is selected for suspend mode.

Figure 5:
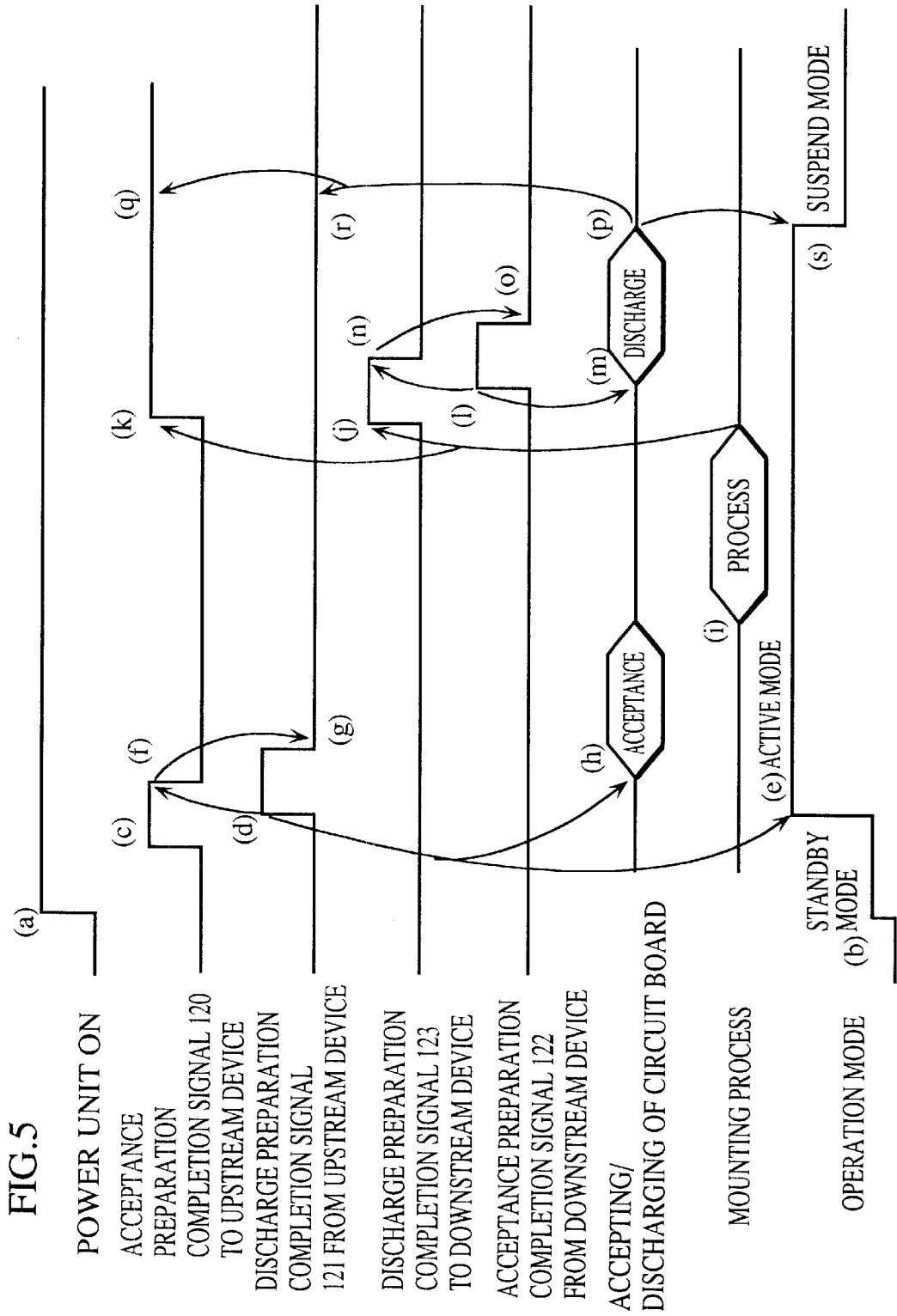
FIG. 5 is a timing chart showing the execution timing of each process of the electronic component mounting device.

When the power unit 102 is switched to ON through the operation input unit 105 by the operator ((a) in FIG. 5), the controller 101 switches the operation mode to standby mode ((b) in FIG. 5). Specifically, the controller 101 sets its clock frequency to M (middle speed)(step S301).

The controller 101 sends an acceptance preparation completion signal 120 to the upstream apparatus 150 ((c) in FIG. 5), and waits to receive a discharge preparation completion signal 121 from the upstream device 150 (steps S302, S303).

On receiving the discharge preparation completion signal 121 from the upstream device 150 ((d) in FIG. 5), the controller 101 switches the operation mode to active mode ((e) in FIG. 5). That is, the controller 101 switches all the relay apparatuses 104a to 104c to ON, and sets the clock frequency of its own CPU to H (high speed). In addition, the controller 101 stops sending the acceptance preparation completion signal 120 to the upstream device 150 ((f) in FIG. 5). As a result, the upstream apparatus 150 stops sending the discharge preparation completion signal 121 ((g) in FIG. 5)(step S304).

The circuit board discharged from the upstream device 150 is accepted((h) in FIG. 5), and the components are mounted ((i) in FIG. 5)(steps S305 and S306).

The controller 101, after the mounting of components is complete, sends a discharge preparation completion signal 123 to the downstream device 160 ((j) in FIG. 5) and sends an acceptance preparation completion signal 120 to the upstream device 150 ((k) in FIG. 5)(step S307).

The controller 101 waits a predetermined amount of time to receive an acceptance preparation completion signal from the upstream device 160 ((l) in FIG. 5), and discharges the circuit board ((m) in FIG. 5) as well as stops sending the discharge preparation completion signal 123 to the downstream device ((n) in FIG. 5). As a result, the downstream device 160 also stops sending the acceptance preparation completion signal 122 ((o) in FIG. 5)(step S308 and S309).

On the other hand, if the controller 101 does not receive an acceptance preparation completion signal from the downstream apparatus within the predetermined time, it switches the operation mode to suspend mode. Specifically, the control unit 101 switches the relay apparatus 104a and the relay apparatus 104b to OFF, and sets the clock frequency of its own CPU to L (low speed)(steps S308 and S312).

The sensor 104 in the control unit 103 senses that the discharging of the circuit board has ended ((p) in FIG. 5), and notifies the controller 101 (step S310).

If the controller 101, on receiving notification that discharging of the circuit board has ended, transmits an acceptance preparation completion signal 120 to the upstream device 150 ((q) in FIG. 5) and does not receive a discharge preparation completion signal 121 from the upstream device 150 ((r) in FIG. 5), it switches the operation mode to suspend mode ((s) in FIG. 5). Specifically, the controller 101 switches the relay apparatuses 104a and 104b to OFF, and sets the clock frequency of its own CPU to L (low speed). Then, the controller 101 returns to step S303, and waits for the discharge preparation completion signal 121 from the upstream apparatus (steps S111, S312, and S303).

On the other hand, if the controller 101 has received the discharge preparation completion signal 121 from the upstream device when it receives notification that discharge has ended, it returns to step S305, and repeats the process from the acceptance of the circuit board (steps S309 and S305).

<Conclusion>

As explained above, the electronic component mounting device of the present embodiment judges promptly whether a circuit board is flowing normally, based oil whether there is an acceptance preparation completion signal from the downstream device, or whether there is a discharge preparation completion signal from the upstream device. When the circuit board is not flowing normally the operation mode is switched to suspend mode, which consumes a relatively low amount of power. As a result, wasteful consumption of power can be prevented, even when processing is not being performed because the circuit board is not flowing normally.

Second Embodiment

The present embodiment relates to an electronic component mounting apparatus for an electronic component mounting line that uses a timer to measure waiting time for accepting and discharging a circuit board, judges whether the circuit board is flowing normally, and reduces its own power consumption if the circuit board is not flowing normally.

<Structure>

Figure 6:
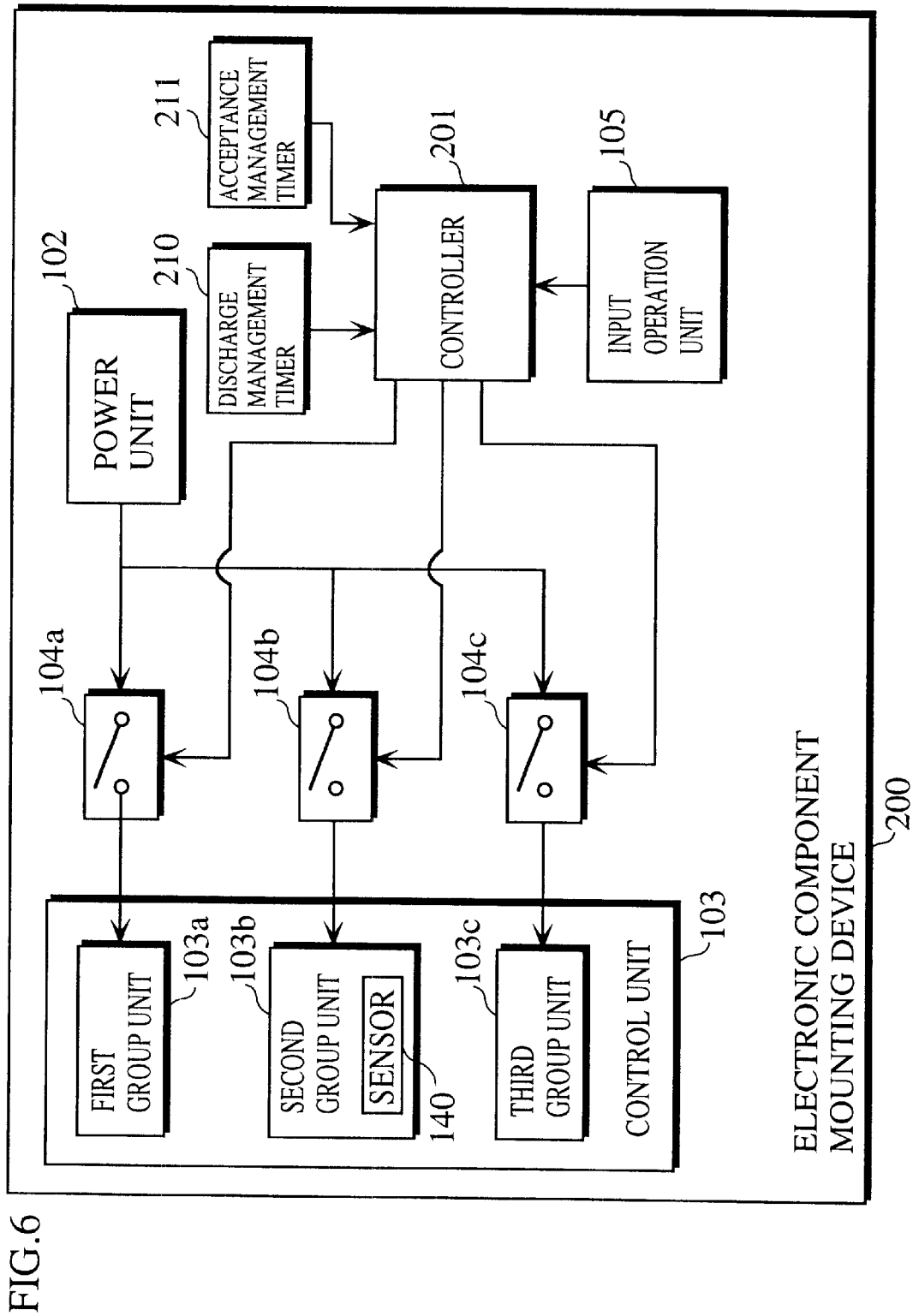
FIG. 6 is a block diagram of the structure of the electronic component mounting device in an embodiment of the present invention.

FIG. 6 is a block diagram of the structure of the electronic component mounting apparatus of the present embodiment. The electronic component mounting apparatus of the present embodiment differs from that of the first embodiment shown in FIG. 2 in that it has an acceptance management timer 211 and a discharge management timer 210 in addition, and a different power consumption control method. The following explains the parts that are different from the first embodiment.

The acceptance management timer 211 receives an instruction from a controller 201, measures the time elapsed since preparation for accepting a circuit board has been completed, and notifies the controller 201 when a predetermined amount of time has passed.

The discharge management timer 210 receives an instruction from the controller 201, measures the time elapsed since preparation for discharging a circuit board has been completed, and notifies the controller 201 when a predetermined amount of time has passed.

The controller 201 switches the operation mode according to the following rules B1 and B2.

B1: The controller 201 switches to suspend mode when, in active mode, a circuit board is not accepted even after the predetermined time has passed since preparation for acceptance has been completed (notification from the acceptance management timer 211).

B2: The controller 201 switches to suspend mode when, in active mode, there is an irregularity in the line downstream and the circuit board cannot be accepted, even after the predetermined time has passed since preparation for discharging has been completed (notification from the discharge management timer 210).

<Operations>

Figure 7:
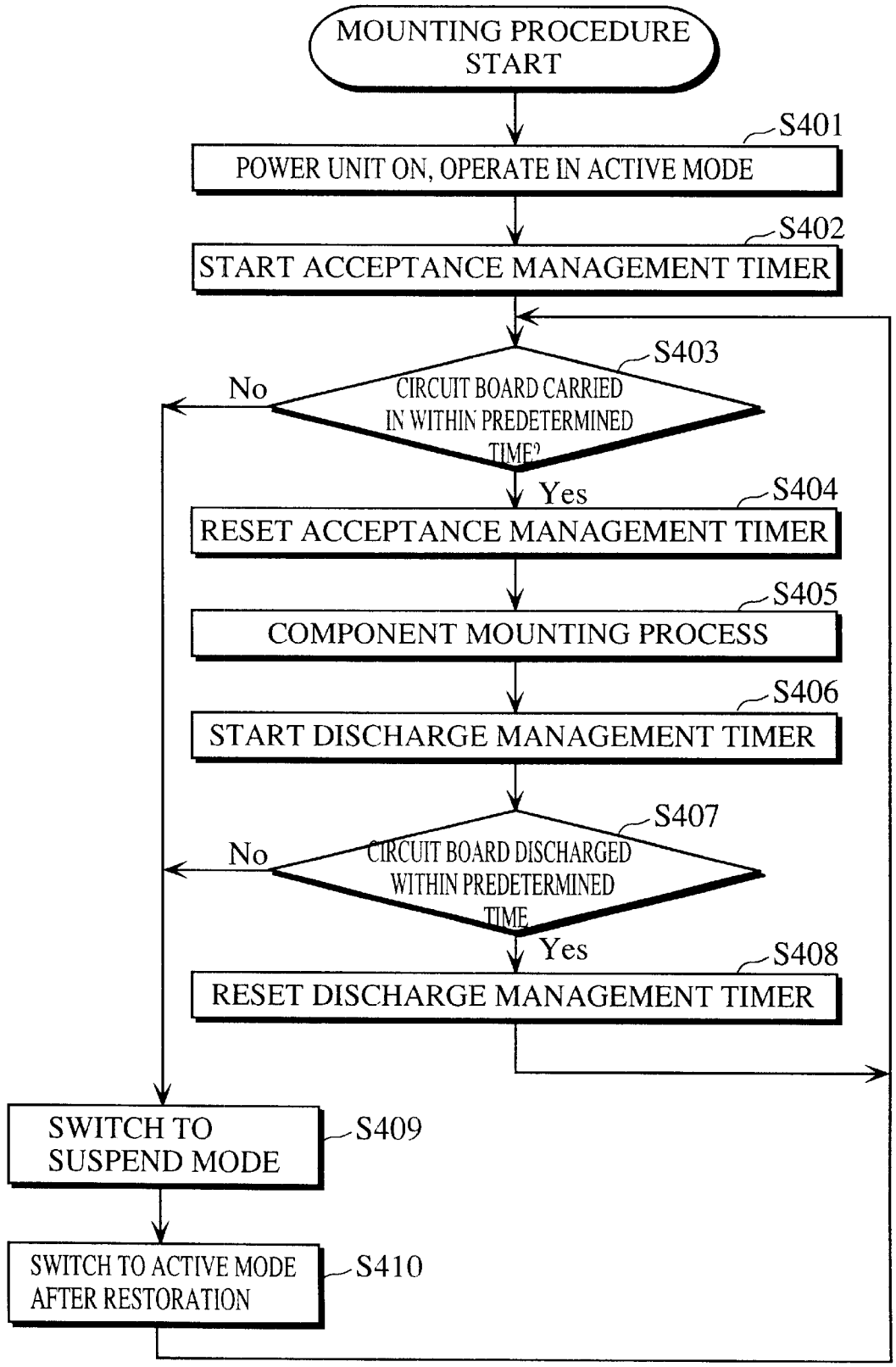
FIG. 7 is a flowchart showing the operations of the processes of the electronic component mounting device.

Next the operations of the electronic component mounting device of the present embodiment will be explained. FIG. 7 is a flowchart showing the operations of the processes of the electronic component mounting device, and FIG. 8 is a timing chart showing the execution timing of each operation.

Figure 8:
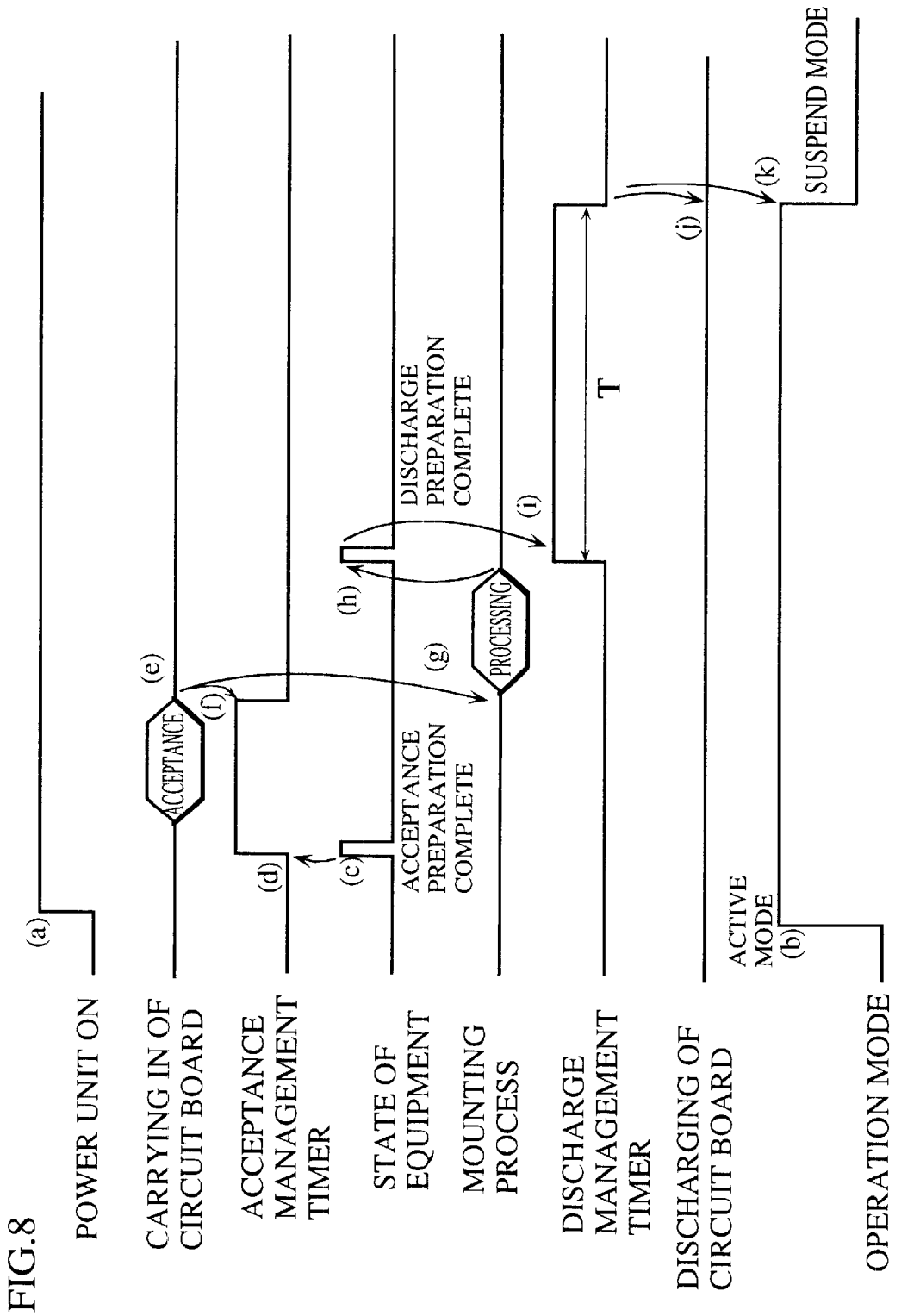
FIG. 8 is a timing chart showing the execution timing of each process of the electronic component mounting device.

When the power unit 102 is switched to ON through the operation input unit 105 by the operator ((a) in FIG. 8), the controller 201 switches the operation mode to standby mode ((b) in FIG. 8). Specifically, the controller 201 switches all the relay apparatuses 104a to 104c to ON, and sets its clock frequency to H (High speed)(step S401).

When preparation to accept a circuit board has been completed ((c) in FIG. 8), the control unit 201 starts the acceptance management timer 210 ((d) in FIG. 8)(step S402).

When the circuit board is accepted from the upstream device 150 within the predetermined time ((e) in FIG. 8), the control unit 201 resets the acceptance management timer 210 ((f) in FIG. 8) and performs the component mounting procedure ((g) in FIG. 8)(steps S403, S404, and S405).

On the other hand, if the circuit board is not accepted from the upstream device 150 within the predetermined time, the controller 201 switches the operation mode to suspend mode. Specifically, the controller 201 switches the relay apparatus 104a and the relay apparatus 104b to OFF, and sets the clock frequency of its own CPU to L (low speed) (steps S403 and S408).

After the component mounting process is complete, the controller 201 completes preparation to discharge the circuit board ((h) in FIG. 8) and starts the discharge management timer 211 ((i) in FIG. 8)(step S406).

When the sensor 140 in the control unit 103 senses that the circuit board has been discharged within the predetermined time, the controller 201 resets the discharge management timer 211 (steps S407 and S408).

On the other hand, if, within the predetermined time (T in FIG. 8), the sensor 140 in the control unit 103 does not detect that the circuit board has been discharged ((j) in FIG. 8), the controller 201 switches the operation mode to suspend mode ((k) in FIG. 8). Specifically, the controller 201 switches the relay apparatuses 104a and 104b to OFF, and sets the clock frequency of its own CPU to L (low speed)(steps S407 and S408).

In addition, the controller 201 moves back into active mode and resumes operations (step S410) after moving into suspend mode due to detection by the sensor of the flow of the circuit board, or reception of an acceptance preparation completion signal, a discharge preparation completion signal, or any other signal showing that the apparatus is operating normally, due to the irregularity of the apparatus being fixed and the circuit board flowing. The controller 201 may also resume operations due to an operation by the operator.

<Conclusion>

As explained above, the electronic component mounting device of the present embodiment judges promptly whether a circuit board is flowing normally, based on whether a predetermined amount of time has passed since preparation for discharging or accepting has been completed. When the circuit board is not flowing normally the operation mode is switched to suspend mode, which consumes a relatively low amount of power. As a result, wasteful consumption of power can be prevented, even when processing is not being performed due the circuit board not flowing normally.

Variations

Note that the present invention is not limited to the above-described embodiments, but the following examples of variations are also possible.

(1) Control Unit

In the embodiments, the control unit is divided into three groups, but it is not limited to three, and may be divided into two groups, or into numerous groups. Furthermore, the type of units belonging to each group are not limited to those examples shown in the embodiments.

(2) Stages of Operation Mode Adjustment

In the embodiments, the operation mode is switched from active mode (operation mode=1) to suspend mode (operation mode=3) when a circuit board is not flowing normally, but the switching is not limited to this method. The operation mode may be switched in stages as time passes. For example, when a circuit board does not flow normally, the operation mode may be switched from "1" (all units ON) to operation mode "2" (first group unit OFF) after 10 minutes, to operation mode "3" after one hour (first and second group units OFF), to operation mode "4" after five hours (all units OFF), and cut off power supply in stages starting from the control unit which does not take time to start up (warm up).

(3) Control of Power Consumed by the Controller

In the embodiments, the frequency of the controllers 101 and 201 is controlled, but the voltage may be controlled.

(4) Sensing of the End of Discharge of a Circuit Board

In the embodiments the sensor 104 in the control unit 103 for sensing the end of discharging of a circuit board is a transparent optical sensor, but it may be another type of sensor such as a mechanical sensor, or not a sensor, but rather, it may determined whether the circuit board has been discharged by execution management by a program.

(5) Judgment of Whether a Circuit Board has been Discharged

Judgment that the circuit board has not been discharged is not limited to being made when the circuit board has not been discharged within a predetermined time after the preparation to discharge the circuit board is complete as in the embodiments. For example, the circuit board may be judged to not have been discharged when it is not discharged within a predetermined time after being accepted.

(6) Transmission of Control Signals to Other Apparatuses

In the embodiments the apparatus adjusts the amount of power it consumes when the circuit board is not flowing normally, but the power consumption of other apparatuses may be adjusted. For example, the apparatus may detect whether the circuit board is flowing normally or whether an irregularity has occurred, and send an instruction signal to another apparatus to adjust power consumption. The other apparatus may adjust its power consumption based on the signal. Furthermore, the apparatus may send an instruction signal to all other apparatuses at once to turn their power off

(7) Management of Circuit Boards in Groups

In the embodiments, management of the accepting and discharging was performed for one circuit board at a time, but circuit boards may be managed in groups of several circuit boards.

(8) Mounting Line

In the embodiments, adjustment of power consumption when the electronic component mounting device detects an irregularity in the flow of the circuit board is explained with the solder printing device as the upstream device and the sensor as the downstream device, but this function may be applied to not only an electronic component mounting device but also another a production apparatus of another production line.

In addition, the apparatus is not limited to the mounting line for mounting electronic components to a circuit board explained ill the embodiments, but may of course be applied to a production line for assembling other components.

(9) Method, Control Program and Recording Medium

The present invention may also be the control methods in the above-described embodiments. These methods may be a control program which is realized by a computer. In addition, the present invention may be a computer-readable recording medium on which the control program is recorded.

What is claimed is:

1. A production apparatus for performing a procedure in a mounting line for mounting electronic components to a circuit board, said production apparatus comprising a controller operable to judge, when said production apparatus is prepared to accept a circuit board from an upstream production apparatus to perform the procedure on the circuit board, whether there is a circuit board from the upstream production apparatus to be accepted by said production apparatus, and operable to control an amount of power used by said production apparatus so that energy consumption by said production apparatus is reduced when said controller judges that there is no circuit board to be accepted.

2. A production apparatus of claim 1, wherein said controller is operable to receive a first signal from the upstream production apparatus that provides notification that the upstream production apparatus is prepared to discharge a circuit board, and wherein said controller is operable to judge, if the first signal is not received from the upstream production apparatus, that there is no circuit board to be accepted.

3. A production apparatus of claim 1, wherein said controller is operable to judge, when a circuit board has not been accepted by said production apparatus within a predetermined time after said production apparatus is prepared to accept the circuit board from the upstream production apparatus, that there is no circuit board to be accepted.

4. A production apparatus of claim 1, further comprising a plurality of control components, wherein said controller is operable to stop power supply to each of said plurality of control components successively in ascending order according to a time required for warming up each of said plurality of control components when said production apparatus is prepared to accept the circuit board from the upstream production apparatus.

5. A production apparatus of claim 4, wherein said controller has a central processing unit, and said controller is operable to reduce a clock frequency supplied to said central processing unit in response to a result of a judgment by said controller.

6. A production apparatus for performing a process in a mounting line for mounting electronic components to a circuit board, said production apparatus comprising a controller operable to judge, when said production apparatus is prepared to discharge a circuit board to a downstream production apparatus after the procedure is performed on the circuit board, whether there is an irregularity in a line which is to carry the circuit board to the downstream production apparatus, and operable to control an amount of power used by said production apparatus so that energy consumption by the production apparatus is reduced when said controller judges that there is an irregularity in the line which is to carry the circuit board to the downstream production apparatus.

7. A production apparatus of claim 6, wherein said controller is operable to judge that there is an irregularity in the line which is to carry the circuit board to the downstream production apparatus when said production apparatus does not discharge the circuit board within a predetermined time after said production apparatus is prepared to discharge the circuit board to the downstream production apparatus.

8. A production apparatus of claim 6, further comprising a plurality of control components,
wherein said controller is operable to stop power supply to each of said plurality of control components successively according to a time required for warming up of each of said plurality of control components when said production apparatus is prepared to accept the circuit board from an upstream production apparatus to perform the procedure on the circuit board.

9. A production apparatus of claim 8, wherein said controller has a central processing unit, and said controller is operable to reduce a clock frequency supplied to said central processing unit in response to a result of a judgment by said controller.

10. A production apparatus for performing a procedure in a mounting line for mounting electronic components to a circuit board, said production apparatus comprising:
a controller operable to judge, when said production apparatus is prepared to discharge a circuit board to a downstream production apparatus after the procedure is performed on the circuit board, whether the downstream production apparatus can accept the circuit board, and operable to control an amount of power used by said production apparatus so that energy consumption by said production apparatus is reduced when said controller judges that the downstream production apparatus cannot accept the circuit board.

11. A production apparatus of claim 10, wherein said controller is operable to receive a first signal from the downstream production apparatus that provides notification that the downstream production apparatus is prepared to receive the circuit board, and
wherein said controller is operable to judge, if the first signal is not received when an upstream production apparatus is prepared to discharge a circuit board, that the downstream production apparatus cannot accept the circuit board.

12. A production apparatus of claim 10, further comprising a plurality of control components,
wherein said controller is operable to stop power supply to each of said plurality of control components successively according to a time required for warming up each of said plurality of control components when said production apparatus is prepared to accept a circuit board from an upstream production apparatus.

13. A production apparatus of claim 11, wherein said controller has a central processing unit, and said controller is operable to reduce a clock frequency supplied to said central processing unit in response to a result of a judgment by said controller.

14. A production apparatus for performing a procedure in a mounting line for mounting electronic components to a circuit board, said production apparatus comprising a controller operable to receive an instruction signal from another production apparatus on the mounting line instructing said controller to reduce energy consumption of said production apparatus, and operable to control, when the instruction signal is received, an amount of power used by said production apparatus to reduce the energy consumption by said production apparatus.

15. A production apparatus for performing a procedure in a mounting line for mounting electronic components to a circuit board, said production apparatus comprising a controller operable to judge that an irregularity in a procedure in the mounting line exists, and operable to transmit, when the irregularity is judged to exist, an instruction signal instructing another production apparatus on the mounting line to reduce energy consumption.

16. A control method for a production apparatus for performing a procedure in a mounting line for mounting electronic components to a circuit board, said control method comprising:
judging, when the production apparatus is prepared to accept a circuit board from an upstream production apparatus to perform the procedure on the circuit board, whether there is a circuit board to be accepted from the upstream production apparatus; and
controlling an amount of power used by the production apparatus so that energy consumption by the production apparatus is reduced when said judging judges that there is no circuit board to be accepted.

17. A control method for a production apparatus for performing a procedure in a mounting line for mounting electronic components to a circuit board, said control method comprising:
judging, when the production apparatus is prepared to discharge a circuit board to a downstream production apparatus after the procedure is performed on the circuit board, whether there is an irregularity in a line which is to carry the circuit board to the downstream production apparatus after the procedure is performed on the circuit board; and
controlling an amount of power used by the production apparatus so that energy consumption by the production apparatus is reduced when said judging judges that there is an irregularity in the line which is to carry the circuit board to the downstream production apparatus.

18. A control method for a production apparatus for performing a procedure in a mounting line for mounting electronic components to a circuit board, said control method comprising:
judging, when the production apparatus is prepared to discharge a circuit board to a downstream production apparatus after the procedure is performed on the circuit board, whether the downstream production apparatus can accept the circuit board; and
controlling an amount of power used by the production apparatus so that energy consumption by the production apparatus is reduced, when said judging judges that the downstream production apparatus cannot accept the circuit board.

19. A control program embodied on a computer-readable medium that controls a production apparatus for performing a procedure in a mounting line for mounting electronic components to a circuit board, said control program comprising:
a judging operation that judges, when the production apparatus is prepared to accept a circuit board from an upstream production apparatus to perform the procedure on the circuit board, whether there is a circuit board to be accepted from the upstream production apparatus; and
a controlling operation that controls an amount of power used by the production apparatus so that energy consumption by the production apparatus is reduced when said judging operation judges that there is no circuit board to be accepted.

20. A control program embodied on a computer-readable medium that controls a production apparatus for performing a procedure in a mounting line for mounting electronic components to a circuit board, said control program comprising:

a judgment operation that judges, when the production apparatus is prepared to discharge a circuit board to a downstream production apparatus after the procedure is performed on the circuit board, whether there is an irregularity in a line which is to carry the circuit board to the downstream production apparatus; and a control operation that controls an amount of power used by the production apparatus so that energy consumption by the production apparatus is reduced when said judgment operation judges that there is an irregularity in the line which is to carry the circuit board to the downstream production apparatus.

21. A control program embodied on a computer-readable medium that controls a production apparatus for performing a procedure in a mounting line for mounting electronic components to a circuit board, said control program comprising:

a judgment operation that judges, when the production apparatus is prepared to discharge a circuit board to a downstream production apparatus after the procedure is performed on the circuit board, whether the downstream production apparatus can accept the circuit board; and a control operation that controls an amount of power used by the production apparatus so that energy consumption by the production apparatus is reduced when said judgment operation judges that the downstream production apparatus cannot accept the circuit board.

* * * * *